Dec. 18, 1962  E. W. ONULAK  3,068,994
CHAIN
Filed Feb. 8, 1960
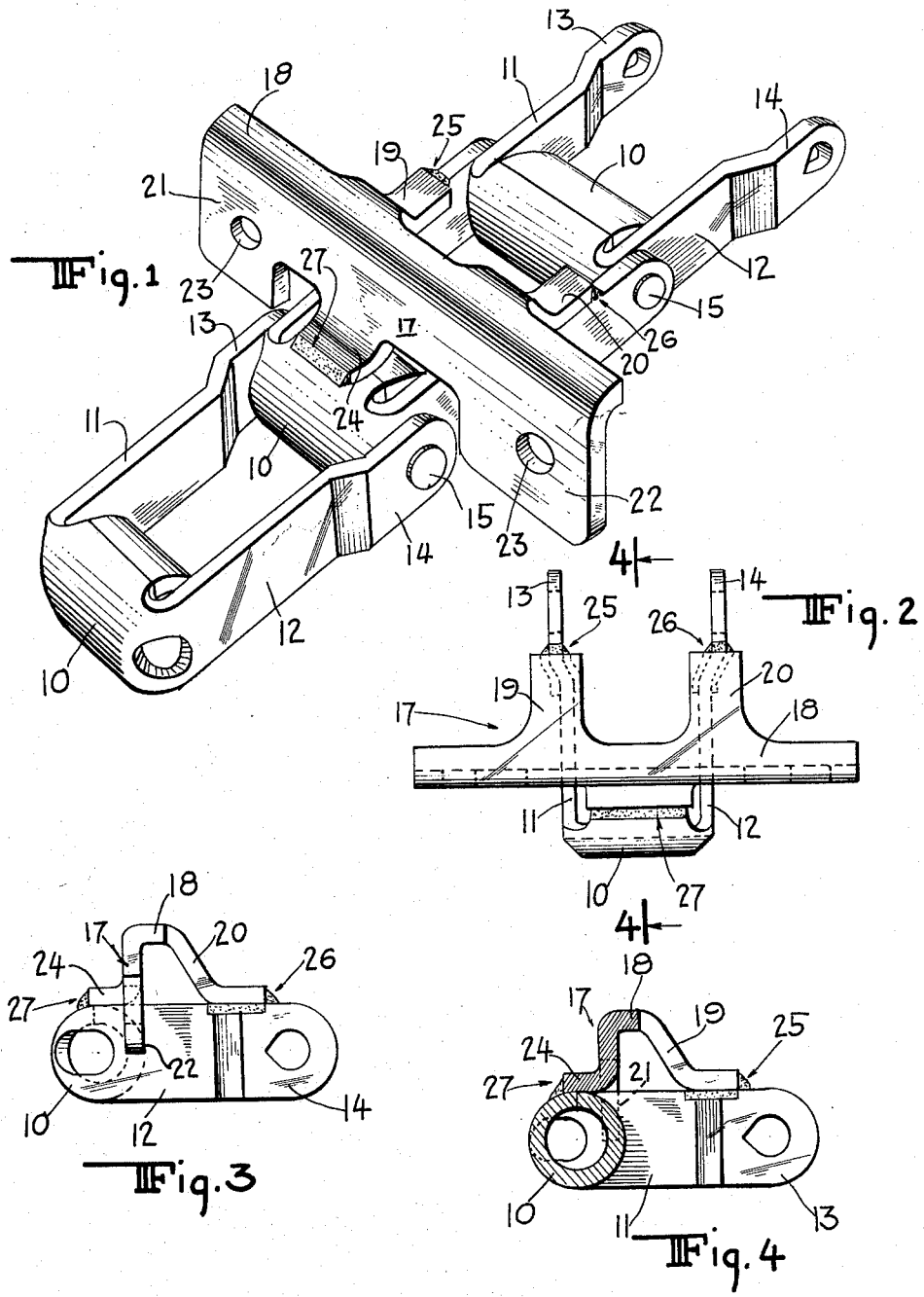
INVENTOR
EUGENE W. ONULAK
BY
Robertson & Smythe
ATTORNEYS

United States Patent Office 3,068,994
Patented Dec. 18, 1962

3,068,994
CHAIN
Eugene W. Omulak, Trumbull, Conn., assignor to The Locke Steel Chain Company, Huntington, Ind., a corporation of Connecticut
Filed Feb. 8, 1960, Ser. No. 7,355
2 Claims. (Cl. 198—189)

This invention relates to a chain link, and particularly to a chain link having an attachment plate secured thereto in such a manner that a load applied to the attachment plate is evenly distributed to the chain link.

The invention is particularly adapted for use with chain links of the type such as those shown in Patent No. 2,793,536. The conventional procedure for securing attachment plates to chain links is to secure the plates or attachments to one of the legs of the link or if the attachment is required on both sides of the link then independently on each of the legs. Such a procedure has not proved completely satisfactory with chains utilizing the above-mentioned links, since the legs tend to move apart or the pin heads break when the load is applied, thereby resulting in failure of the chain.

It is an object of this invention to provide a chain link having an attachment plate secured thereto in such a manner that a load applied to the attachment plate is distributed evenly over the entire chain link.

It is a further object of this invention to provide a chain link having an attachment plate secured thereto which has high structural strength while utilizing a minimum amount of material.

It is a still further object of this invention to provide a chain link having attachment means secured thereto at three spaced and evenly distributed points so that a load on the attachment means is transmitted through these points to the entire chain link.

In one aspect, the combination of the invention includes a chain link having a pair of spaced parallel legs joined at only one end by a transverse bushing. Secured to said link at three spaced points is an attachment means, one of said points being on the transverse bushing and the other points being on the legs in longitudinally spaced relation to the bushing. Thus, a load applied to the attachment means is transmitted through the three points of securement to the entire link.

According to a further aspect of the invention, the attachment means has a forwardly disposed central tab extending from its lower edge which is secured to the bushing and a pair of spaced rearwardly disposed side tabs extending from its upper edge which are secured to the corresponding leg on the chain link. This construction ensures even distribution of the load without interfering with the normal operation of the chain link.

According to a still further aspect of the invention, the attachment plate is vertically disposed and extends transversely beyond the sides of the chain link. For increased stability the side portions extend below the top edge of the link.

The foregoing and other objects, features and advantages hereof will become apparent from the following description and drawings which are merely exemplary.

In the drawings:

FIG. 1 is a perspective view of a chain including the chain link and attachment plate combination of the invention;

FIG. 2 is a plan view of the chain link with the attachment thereon;

FIG. 3 is a side elevational view of the chain link of FIG. 2; and

FIG. 4 is a cross-sectional view of the chain link of FIG. 2 taken along the line 4—4 of FIG. 2, looking in the direction of the arrows.

As can be seen best in FIG. 1, the combination of the invention is particularly adapted for use with a chain made up of a number of links (only three of which are shown in FIG. 1) of the type disclosed in the above-mentioned patent, No. 2,793,536. Such a link is formed from a single integral blank and includes a tubular bushing 10 and a pair of bent over legs 11 and 12 which cover the ends of bushing 10. Legs 11 and 12 are generally parallel to each other and preferably have their ends offset away from each other, as at 13 and 14. Legs 11 and 12 have aligned holes formed therein which are also aligned with the axis of bushing 10. The offset ends 13 and 14 of legs 11 and 12 also have aligned holes formed therein, so that when the offset ends are positioned adjacent the base of legs 11 and 12 of the next link, the holes in legs 11 and 12, the axis of the respective bushing, and the holes in respective offset ends 13 and 14 are aligned and positioned to receive connecting pin 15 therethrough, to thereby form a continuous piece of chain. Pins 15 may have their heads flattened so as to hold the pins in proper position relative to the links.

In order to secure various parts to a completed chain, attachment plates have to be secured to certain of the links of the chain. It has been found that the attachment plate has to be so disposed that the load transmitted therefrom to the link is evenly distributed in order to avoid any failure due to twisting of the attachment plate by force exerted thereon. However, care must be taken to avoid interfering with the proper operation of the link. These problems have been overcome by the particular combination of the invention.

As best seen in FIGS. 1 and 2, the attachment plate 17 overlies and extends transversly across legs 11 and 12 and bushing 10. Plate 17 is vertically disposed and has a flanged upper edge 18 from which extend a pair of spaced rearwardly disposed tabs 19 and 20. These tabs extend downwardly to a position where they can be secured to legs 11 and 12, respectively, as by welding. The lower portion of plate 17 is cutout so that the link can fit therebetween and so that the side portions 21 and 22 of the plate can extend below the top surface of the link. Suitable accessories can be secured to the side portions by any desired means, as by holes 23 in the drawings. Extending forwardly and downwardly from the central lower edge of plate 17 is a tab 24 which may be secured to bushing 10, as by welding. Plate 17, flanged portion 18, tabs 19, 20 and 24, and side portions 21 and 22 are formed as a single unitary part which is secured to a one piece link at three spaced, evenly distributed points 25, 26 and 27. Thus, the entire link, attachment plate construction is formed from two sheets of metal which are properly shaped and secured together in a manner such that any load applied to the attachment plate is evenly distributed to the entire link.

It is to be understood that the described exemplary embodiments are merely intended for the purpose of illustration, and that the principles of the invention are not intended to be limited thereto and can be applied to chains having side bars joined in various manner, except as defined in the appended claims.

What is claimed is:

1. A one piece chain link formed from a sheet metal blank and including a pair of spaced parallel legs, said legs being joined at one end by a transverse bushing, said legs having relatively thin upper edges and having flat surfaces facing each other, said bushing having an upper surface lying in the same plane as said thin upper edges, and a one piece vertically disposed transversely extending attachment plate having a central forwardly facing tab extending from a bottom edge of said attachment plate and welded to said bushing upper surface and having a pair of spaced rearwardly facing tabs extending from the top edge of the attachment plate, each of said rearwardly facing tabs overlying and being welded to one of said relatively thin leg upper edges, so that a load applied to said plate is distributed through points of attachment to said bushing and thin edges to the entire link, the space between said rearwardly facing tabs being completely free so that the operation of the link is not affected by the attachment plate, said attachment plate having side portions extending beyond the corresponding sides of said link so that the link is located below the lower central edge of the attachment plate.

2. A one piece chain link formed from a sheet metal blank and including a pair of spaced parallel legs, said legs being joined at only one end by a transverse bushing formed from said blank, said legs having relatively thin edges and having flat surfaces facing each other, and a one piece vertically disposed transversly extending attachment plate having a central forwardly facing tab extending from a bottom edge of said attachment plate and welded to said bushing and a pair of spaced rearwardly facing tabs extending from the top edge of the attachment plate, each of said rearwardly facing tabs overlying and being welded to a corresponding one of said relatively thin leg edges, so that a load applied to said plate is distributed through the points of attachment to said bushing and thin edges to the entire link, the space between said rearwardly facing tabs being completely free so that the operation of the link is not affected by the attachment plate, said attachment plate having side portions extending beyond the corresponding sides of said link and below the top edges thereof, so that the link is located below the lower central edge of the attachment plate and between said side portions.

References Cited in the file of this patent

UNITED STATES PATENTS

| 745,361 | Levalley | Dec. 1, 1903 |
| 1,638,267 | Morehead et al. | Aug. 9, 1927 |
| 2,793,536 | Onulak | May 28, 1957 |

FOREIGN PATENTS

| 838,122 | Germany | May 5, 1952 |